May 3, 1955          G. F. ROTSLER          2,707,597
FISHING REEL
Filed June 10, 1948
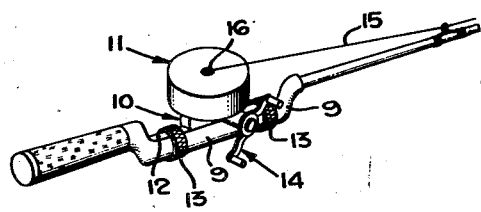
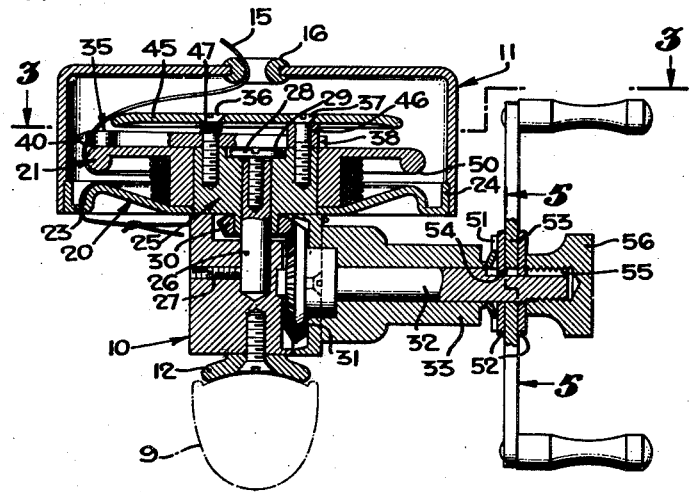
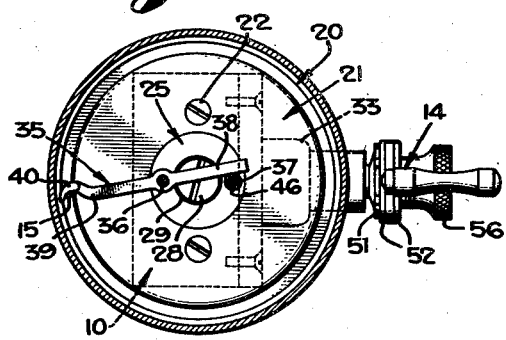
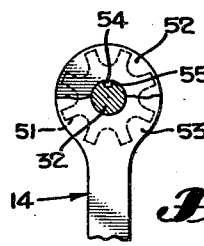
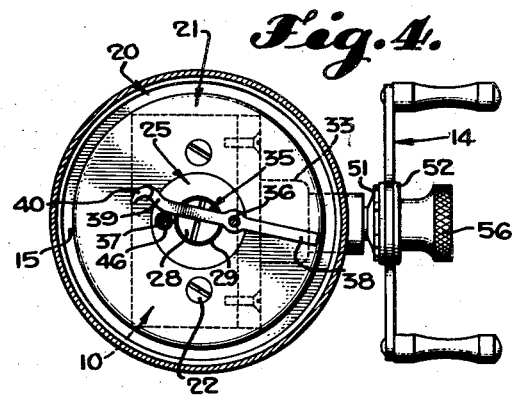
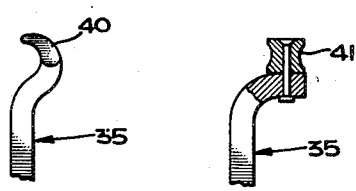
GEORGE F. ROTSLER,
INVENTOR.
BY
*Robert W. Fulwider*
ATTORNEY

United States Patent Office 2,707,597
Patented May 3, 1955

2,707,597

FISHING REEL

George F. Rotsler, Los Angeles, Calif.

Application June 10, 1948, Serial No. 32,144

3 Claims. (Cl. 242—84.5)

My invention relates generally to fishing reels, and more particularly to such reels in which the spool remains stationary while the line is unwound over an end thereof.

Such reels are sometimes referred to as "spinning reels" although this title is only technically correct when used in connection with reels in which the spool is held stationary during the unreeling of line therefrom, and is rotated to rewind the line thereon. In such instances, it will be seen that a twist is put in the line during the unreeling operation and such twist is not removed during the rewinding operation. The result of this twist is that as the line is rewound by rotating the spool the entire line tends to rotate about its own axis which is sometimes desirable in rotating a spoon or spinner.

Usually however, the aforesaid rotating action of the line is more harmful than otherwise. It often produces kinks and snarls in the line and if used, for example, with non-rotating lures, swivels must be provided in the line to prevent the lure from rotating.

This tendency of the line to twist and untwist has been overcome in the past by providing a construction in which the spool is stationary during both the unwinding and winding operations. Such construction contemplates usually a rotating arm or flier through which the line is guided and which flier is caused to rotate about the axis of the stationary spool thus winding the line thereon.

It is obvious that such construction must be so designed that the flier may be retracted or withdrawn from its position adjacent the periphery of the spool during casting or unwinding operations, thus to permit free motion of the line as it unwinds from the spool. It has been customary in the past to provide separate manually operated levers or other mechanical parts which are pressed or rotated in order to retract the flier and permit the line to be cast. Such mechanisms have several different disadvantages in that they require a separate operation after rewinding the line in order to put the reel in condition for casting. Furthermore, such mechanisms have, in the past, been quite complicated and have required a substantial number of interlocking parts.

Bearing in mind the difficulties above stated, it is one object of my invention to provide a fishing reel of the class described in which the line is unwound and rewound on a stationary spool.

It is another object of my invention to provide a reel of the class described in which the rotating flier used to wind the line is automatically retracted after the winding operation by a slight counter-rotation of the winding handle.

It is a further object of my invention to provide a reel of the class described in which the spool and winding mechanism is entirely enclosed to exclude twigs, leaves, and other foreign matter from the reel.

It is a still further object of my invention to provide a reel of the class described which automatically removes any twist from the line each time the line is rewound on the spool.

The foregoing and other objects and advantages of my invention will become apparent from the following detailed description of a casting reel embodying the invention, such consideration being given also to the attached drawings in which:

Figure 1 is a partial perspective view illustrating my reel attached to a casting rod;

Figure 2 is an enlarged transverse elevational section taken on an axial plane through the reel illustrated in Figure 1;

Figure 3 is a plan view taken on the line 3—3 in Figure 2, showing the reel in rewinding position;

Figure 4 is a view similar to Figure 3 showing the reel in casting operation;

Figure 5 is an elevational section taken on the line 5—5 in Figure 2;

Figure 6 is an enlarged fragmentary view of the flier employed in the reel illustrated in Figure 2; and Figure 7 is an enlarged fragmentary view of a modified flier, such as may be used in connection with the reel illustrated in Figure 2.

Referring first to Figures 1 and 2, it will be seen that the reel embodying my invention comprises a body member 10 carrying a cylindrically shaped housing 11 in which the spool is located, the body 10 being provided with a tang member 12 which extends longitudinally therefrom and is adapted to be secured to a fishing rod 9 by means of ferrule-like members 13, in the conventional manner. The reel is provided with a double winding handle 14 and the line 15 is led through a centrally located guide ring 16 at the top of the housing 11.

The spool within the housing 11 on which the line 15 is wound is comprised of a base member 20 and a flange member 21 which are fixedly secured to the body 10 by means of screws 22 (see Figure 3) which pass downwardly through the wall of the central annular core portion of the flange member 21 and are threaded into the body 10.

A small hole 23 is formed in the base member 20 adjacent the outer periphery thereof, as shown in Figure 2, whereby the line 15 may be secured to the reel by tying a loop therein, passing the loop through the hole 23, and looping it around the body 10 or other convenient projection below the reel. The base member 20 is also formed with an upturned flange 24 thereon whereby the housing 11 may be secured thereto, either by threading or by conventional detents (not shown) formed therein.

When initially threading the line on the reel illustrated herein, the housing 11 is removed from the base member 20, a loop is tied in the line 15, the loop end is passed through the guide ring 16 in the housing 11, and thence through the hole 23 and looped around a projection as previously stated. The housing 11 is then placed on the base member 20 and the reel is ready for operation.

Coaxially disposed within the flanged member 21 is a rotatable hub member 25 which is journally supported on a fixed stub shaft 26 secured in the body 10 by means of a set screw 27. The hub member 25 is retained on the stub shaft 26 by means of a washer-headed screw 28 threaded into the upper end of the stub shaft 26, a suitable recess 29 being formed in the upper surface of the hub member 25 in order to receive the head of the screw 28.

A bevel pinion 30 is secured to the lower surface of the hub member 25 for rotation therewith, the bevel pinion 30 being meshed with a relatively larger bevel gear 31 secured on the inner end of a shaft 32 journally mounted in a lateral projection 33 formed in the body 10. The handle 14 is secured to the outer end of the shaft 32, as will hereinafter be described.

Thus, it will be seen that rotation of the handle 14 acting through the shaft 32, the gear 31, and the pinion 30 rotates the hub member 25 on the stationary stub shaft 26. In order now that such rotation of the hub member 25 shall wind the line 15 on the spool 20—21, a radial guide member or flier 35 is movably secured to the upper surface of the hub member 25. A lost motion connection between the hub member 25 and the flier 35 is provided so that the latter is adapted to selectively project beyond the rim of the flanged member 21 whereby to engage the line 15 and carry the same around the spool 20—21 as the handle 14 is rotated, or to be retracted within the area of the spool flange 21.

It is, of course, necessary that the flier 35 be retracted so as not to project beyond the rim of the flange member 21 when the line is to be unwound from the spool 20—21 in casting or other unwinding operations. To this end, the flier 35 is secured to the upper surface of the hub 25 by means of a pivot screw 36 which passes through a relatively loose fitting hole in the flier 35 approximately midway between its two ends.

By reason of a stop screw 37 diametrically opposed to the pivot screw 36, the pivotal motion of the flier 35 about the pivot screw 36 is limited to approximately 180°. The effect of such 180° rotation of the flier 35 may be observed in Figures 3 and 4. By reason of the fact that the rearward extension 38 is slightly shorter than the forward extension 39 of the flier 35, the latter member lies entirely within the periphery of the flange member 21 when rotated to one limiting position as illustrated in Figure 4, whereas when rotated to the other limiting position, the forward extension 39 projects beyond the rim of the flange member 21 as illustrated in Figure 3.

A hook-shaped guide 40 is formed in the forward end of the flier 35 and this part is hardened and polished in order that the line 15 may run freely over the same during winding operations. As illustrated in Figure 7, the free running action of the flier 35 may be further enhanced by providing a small roller 41 at the forward end of the flier 35.

A guard plate 45 is mounted above the flier 35 in order to prevent the line 15 from tangling therewith during unwinding operations. The plate 45 rotates with the hub 25, being secured thereto by means of the pivot screw 36 and the stop screw 37, a spacer 46 being provided under the plate 45 in order to hold the same at a suitable distance above the flange member 21. A small compression spring 47 is positioned between the under surface of the plate 45 and the flier 35 in order to hold the same in light friction engagement with the upper surface of the flange member 21. By reason of the aforesaid frictional engagement of the flier 35 with the flange member 21, rotation of the hub 25 tends to pivot the flier 35 about the axis of the pivot screw 36 in one direction or another, depending on the direction of rotation of the hub 25. Thus, when the handle 14 is rotated in a direction to rewind the line 15 on the spool 20—21, the pivotal motion of the flier 35 effected thereby is such as to project it to the position illustrated in Figure 3, wherein the line 15 is engaged by the guide end 40. When the desired amount of line has been wound on the spool 20—21, a counter-rotation of the handle 14 causes the flier to pivot to the position shown in Figure 4, retracting the same and permitting the line 15 to be freely withdrawn from the spool 20—21.

It will be noted that the flange member 21 is formed with a bead-like protrusion 50 at its outer periphery, the bead 50 extending downwardly from the under surface of the flange member 21. The bead-like protrusion furnishes a smooth friction reducing guide over which the line may pass onto the spool 20—21. Similarly, the base member 20 is conically shaped and sloped upwardly and outwardly toward the bead 50. The result of this spool construction is that the width of the cross-sectional area in which the line is to be wound is wider near the center of the spool than it is near the periphery thereof. Thus, the line is packed into the spool 20—21 and does not tend to pile up along one side of the spool as would be the case if the bead 50 were not provided.

Should a fish be hooked with tackle including the reel illustrated herein, it is of course desired that resistance be applied to the line as it is withdrawn from the spool 20—21. A slight rotation of the handle 14 in a direction to rewind the line will, as previously described, project the flier 35 in position to engage the line. Once the line being withdrawn by the fish engages the guide hook 40 with some tension in the line, the line unwinding from the spool 20—21 will drive the hub 25 in a rearward direction, thus tending to counter-rotate the handle 14.

I have provided a friction drag connection between the shaft 32 and the handle 14 comprising a spring washer 51 anchored against a shoulder in the shaft 32, and pressing outwardly on the innermost of a pair of friction washers 52 engaged with a circular central portion 53 of the handle 14. The friction washers 52 are formed with inwardly extending keys 54 which engage a keyway 55 in the outer end of the shaft 32 whereby to drive the shaft 32 when the friction washers 52 are rotated. The handle 14 is not formed with such a key, however, and may rotate on the shaft 32, the only driving connection being provided through the friction washers 52.

The pressure with which the handle enlargement 53 engages the friction washers 52 may be varied by means of a knurled adjustment nut 56 threaded onto the outer end of the shaft 32. As the nut 56 is adjusted inwardly or outwardly, the frictional engagement between the handle enlargement 53 and the friction washers 52 is increased or decreased respectively, thus varying the amount of drag resistance applied to the line 15 if the handle 14 is held stationary while the flier 35 is counter-rotated.

It will be seen from the construction above described that the operation of the reel embodying my invention is relatively simple. When it is desired to cast the line 15, the handle 14 is counter-rotated slightly to retract the flier 35 and the line 15 will then run freely from the spool 20—21. As soon as it is desired to rewind the line, the handle 14 is merely rotated in the correct direction, whereupon the flier is extended to engage the line and traveling around the rim of the flange member 21, rewinds the line on the spool 20—21.

While the reel construction shown and described herein is fully capable of achieving the objects and providing the advantages hereinbefore stated, it will be realized that it is capable of considerable modification by those skilled in the art without departing from the spirit of the invention. For that reason, I do not mean to be limited to the form shown and described herein, but rather to the scope of the appended claims.

I claim:

1. A fishing reel comprising in combination: a body adapted to be secured to a fishing rod; a stationary spool fixed to said body, said spool including a base plate secured against said body and a flange member having a flat annular flange and a hollow cylindrical core thereon secured against said base plate, said base plate being conical and sloped upwardly and outwardly and said flange having an inwardly projecting bead formed on the periphery thereof whereby to form a relatively wide bottomed line receiving groove in said spool; a stub shaft fixed in said body and coaxial with said spool; a hub rotatably carried on said shaft and having a mounting surface substantially co-planar with an outer surface of said flange; an elongated flier movably secured against said mounting surface by a pivot pin in said hub member, said pivot pin being parallel to and spaced from said stub shaft and said flier extending transversely across said flange and having a line guide formed adjacent an end thereof; a stop pin in said hub member substantially diametrically opposite said pivot pin and adapted to limit swinging motion of said flier about said pivot pin in two selective positions, one in which said line guide projects beyond the rim of said flange and the other in which said flier is retracted and lies entirely within said rim; spring means urging said flier into frictional engagement with said flange whereby to effect said swinging motion of said flier as a result of rotation of said hub member; a stationary central guide spaced above said flange and adapted to position a line leading from said spool groove against said flange rim whereby said line is selectively picked up by said line guide and wound on said spool by rotation of said hub in one direction or said line may be freely withdrawn from said spool after said hub has been counter-rotated to retract said line guide; and a handle member journalled in said body and operatively connected to said hub member whereby to manually rotate the same.

2. A fishing reel comprising in combination: a reel mount adapted to be secured to a fishing rod; a stationary spool fixed to said mount, said spool including a base-plate secured against said mount and a flange member spaced from said base-plate and having a flat annular flange and hollow cylindrical core thereon secured against said base-plate, said flange having an inwardly projecting bead on the periphery thereof whereby to form a relatively with bottomed line-receiving groove in said spool; a shaft in said base plate coaxial with said spool; a hub rotatably carried by said shaft and having a mounting surface thereon adjacent an outer surface of said flange; an elongated flier mounted for reciprocal motion against said mounting surface, said flier extending transversely across said flange and having a line guide formed adjacent one end thereof, said line guide being adapted to project beyond said periphery of said flange and move in an orbit around the axis of said hub; eccentric means on said hub engaged with said flier to reciprocate the same as aforesaid when said hub is rotated and counter-rotated with respect to said flier; a stop in said mounting surface adapted to limit said reciprocal motion of said flier with respect to said hub in two selective positions, one in which said line guide projects beyond the periphery of said flange and the other in which said line guide is retracted and lies entirely within said periphery, said stop forming with said eccentric means, a lost motion rotary drive connection between said hub and flier whereby to permit a limited degree of rotation of said hub without corresponding movement of said line guide in said orbit, and to revolve said line guide in said orbit with said hub after said limited rotation of the latter; spring-urged drag means inter-engaging said flier and flange whereby to frictionally retard revolution of said flier to effect said reciprocal motion of said flier as a result of said limited rotation of said hub; a stationary coaxial guide spaced above said flange and adapted to position a line leading from said spool groove against the periphery of said flange whereby said line is selectively picked up by said line guide and wound on said spool by rotation of said hub in one direction, or said line may be freely withdrawn from said spool after said hub has been counter-rotated to retract said line guide as aforesaid; and a handle member operatively coupled to said hub member whereby to manually rotate the same.

3. The construction of claim 2 further characterized by having a circular guard plate overlying said flier between the same and said coaxial guide whereby to prevent tangling of said line with said flier during said withdrawal of said line.

References Cited in the file of this patent

UNITED STATES PATENTS

| | | |
|---|---|---|
| 1,187,840 | Illingworth | June 20, 1916 |
| 1,587,437 | Sturge | June 1, 1926 |
| 1,890,945 | Hormel | Dec. 13, 1932 |
| 2,034,917 | Miller | Mar. 24, 1936 |
| 2,283,773 | Teitsma | May 19, 1942 |
| 2,299,156 | Lind | Oct. 20, 1942 |
| 2,309,146 | Whistler | Jan. 26, 1943 |
| 2,344,209 | Lowe | Mar. 14, 1944 |
| 2,363,533 | King | Nov. 28, 1944 |
| 2,492,587 | Ledingham | Dec. 27, 1949 |
| 2,507,457 | Rix | May 9, 1950 |
| 2,546,559 | Nix | Mar. 27, 1951 |

FOREIGN PATENTS

| | | |
|---|---|---|
| 22,597 | Great Britain | of 1907 |
| 195,577 | Switzerland | Mar. 2, 1938 |
| 848,152 | France | July 17, 1939 |
| 889,493 | France | Oct. 3, 1943 |